United States Patent
Miyazaki et al.

(10) Patent No.: US 12,515,692 B2
(45) Date of Patent: Jan. 6, 2026

(54) IN-VEHICLE CONTROL DEVICE

(71) Applicant: TOYOTA JIDOSHA KABUSHIKI KAISHA, Toyota (JP)

(72) Inventors: Kohji Miyazaki, Toyota (JP); Shunsuke Oyama, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/811,763

(22) Filed: Aug. 22, 2024

(65) Prior Publication Data

US 2025/0145170 A1 May 8, 2025

(30) Foreign Application Priority Data

Nov. 6, 2023 (JP) ................. 2023-189124

(51) Int. Cl.
*B60W 50/14* (2020.01)

(52) U.S. Cl.
CPC ....... *B60W 50/14* (2013.01); *B60W 2510/083* (2013.01)

(58) Field of Classification Search
None
See application file for complete search history.

(56) References Cited

U.S. PATENT DOCUMENTS

| | | | | |
|---|---|---|---|---|
| 8,417,405 B2 * | 4/2013 | Niwa | ............. | B60W 30/18127 180/65.285 |
| 8,523,297 B2 * | 9/2013 | Morishita | ................. | B60L 7/26 303/151 |
| 9,254,825 B2 * | 2/2016 | Lee | .......................... | B60T 11/16 |
| 10,814,860 B1 * | 10/2020 | Gaither | ................. | B60W 20/40 |
| 12,420,642 B2 * | 9/2025 | Isami | ............. | B60W 30/18127 |
| 2007/0222287 A1 * | 9/2007 | Crombez | .............. | B60W 10/18 303/151 |
| 2008/0140274 A1 * | 6/2008 | Jeon | ................ | B60W 30/18127 701/22 |
| 2010/0179714 A1 * | 7/2010 | Tani | ....................... | F02D 41/08 903/903 |
| 2014/0097676 A1 * | 4/2014 | Kusumi | ................. | B60L 50/16 307/10.1 |
| 2014/0180518 A1 * | 6/2014 | Hayashi | .................. | B60K 6/52 701/22 |
| 2016/0137185 A1 * | 5/2016 | Morisaki | ................. | B60L 50/16 180/65.265 |

(Continued)

FOREIGN PATENT DOCUMENTS

JP 2021-052461 A 4/2021

*Primary Examiner* — Jonathan M Dager
(74) *Attorney, Agent, or Firm* — SoraIP, Inc.

(57) ABSTRACT

When the regenerative torque obtained by the regenerative driving of the electric motor reaches a predetermined threshold or more, a predetermined notification is made and a history of the fact that the predetermined notification has been made is recorded, and the allowable maximum input power that can be input to the power storage device when the predetermined notification is made is stored as the control input power. When there is a history indicating that the predetermined notification has been made, the predetermined notification is performed again when the regenerative torque is equal to or greater than the predetermined threshold and the absolute value of the allowable maximum input power is less than the absolute value of the control input power.

4 Claims, 3 Drawing Sheets

(56) References Cited

U.S. PATENT DOCUMENTS

| | | | |
|---|---|---|---|
| 2017/0036547 A1* | 2/2017 | Mizui | B60L 7/26 |
| 2021/0291661 A1* | 9/2021 | Fujitake | B60L 7/26 |
| 2024/0208336 A1* | 6/2024 | Isami | B60L 15/10 |
| 2025/0145170 A1* | 5/2025 | Miyazaki | B60W 30/18127 |

* cited by examiner

IN-VEHICLE CONTROL DEVICE

CROSS-REFERENCE TO RELATED APPLICATION

This application claims priority to Japanese Patent Application No. 2023-189124 filed on Nov. 6, 2023, incorporated herein by reference in its entirety.

BACKGROUND

1. Technical Field

The present disclosure relates to an in-vehicle control device, and more particularly, to an in-vehicle control device mounted on an electrified vehicle.

2. Description of Related Art

Hitherto, in this type of in-vehicle control device, a difference obtained by subtracting a regenerative braking amount calculated from an operating state of an accelerator pedal from an upper limit regenerative amount calculated from a state of charge of a battery may be smaller than a predetermined amount. In this case, there has been proposed a device that provides guidance for a prompt to depress a brake pedal, such as a message "Please depress the brake." (see, for example, Japanese Unexamined Patent Application Publication No. 2021-052461 (JP 2021-052461 A)). This device reduces the driver's uncomfortable feeling caused by a pedal depression operation when a regenerative braking force cannot be obtained.

SUMMARY

In the above device, however, when the regenerative braking force decreases based on the state of charge of the battery, a notification of guidance for a prompt to depress the brake pedal is frequently performed. The frequent notification of guidance may cause discomfort for the driver or occupant.

An in-vehicle control device according to the present disclosure has a main object to suppress frequent guidance for a prompt to depress a brake pedal when a regenerative braking force decreases based on the state of a power storage device.

The in-vehicle control device of the present disclosure employs the following means to achieve the above main object.

The in-vehicle control device of the present disclosure is to be mounted on an electrified vehicle including an electric motor for traveling and a power storage device configured to exchange electric power with the electric motor. The in-vehicle control device is configured to:
  when regenerative torque obtained by regenerative driving of the electric motor reaches a predetermined threshold or more, perform a predetermined notification and store a record of the predetermined notification, and store, as control input power, maximum permissible input power that is inputtable to the power storage device when the predetermined notification is performed; and
  in a case where the record of the predetermined notification is present, perform the predetermined notification again when the regenerative torque is the predetermined threshold or more and an absolute value of the maximum permissible input power is less than an absolute value of the control input power.

In the in-vehicle control device of the present disclosure, the predetermined notification may be performed when the regenerative torque obtained by the regenerative driving of the electric motor reaches the predetermined threshold or more (the absolute value of the regenerative torque is equal to or less than the predetermined threshold). In this case, the record of the predetermined notification is stored and the maximum permissible input power that is inputtable to the power storage device when the predetermined notification is performed is stored as the control input power. In the case where the record of the predetermined notification is present, the predetermined notification is performed again when the regenerative torque is the predetermined threshold or more and the absolute value of the maximum permissible input power is less than the absolute value of the control input power. That is, the predetermined notification is performed again when the regenerative torque is the predetermined threshold or more (the absolute value of the regenerative torque is equal to or less than the predetermined threshold) and the maximum permissible input power is more than the control input power (the absolute value is smaller). The output torque of the electric motor is a positive value, and the regenerative torque of the electric motor is a negative value. The electric power (discharge power) output from the power storage device is a positive value, and the electric power (charge power) input to the power storage device is a negative value. In the present disclosure, when the record of the predetermined notification is present, the regenerative torque may be the predetermined threshold or more (the absolute value of the regenerative torque may be equal to or less than the predetermined threshold). Even in this case, the predetermined notification is not performed again when the maximum permissible input power is less than the control input power (the absolute value is larger). As a result, it is possible to reduce the occurrence of a case where the predetermined notification is frequently performed when the regenerative braking force decreases based on the state of the power storage device.

In the in-vehicle control device of the present disclosure, an upper limit of the control input power may be guarded by the maximum permissible input power.

That is, the control input power is replaced with the maximum permissible input power when the control input power is less than the maximum permissible input power (the absolute value as the negative value is larger).

In the in-vehicle control device of the present disclosure, the predetermined threshold may be set based on a shift position.

In the in-vehicle control device of the present disclosure, the predetermined notification may include a notification that prompts a driver to perform a brake operation.

The record of the predetermined notification may be cleared when the system is activated, when the absolute value of the maximum permissible input power of the power storage device is a predetermined value or more, etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
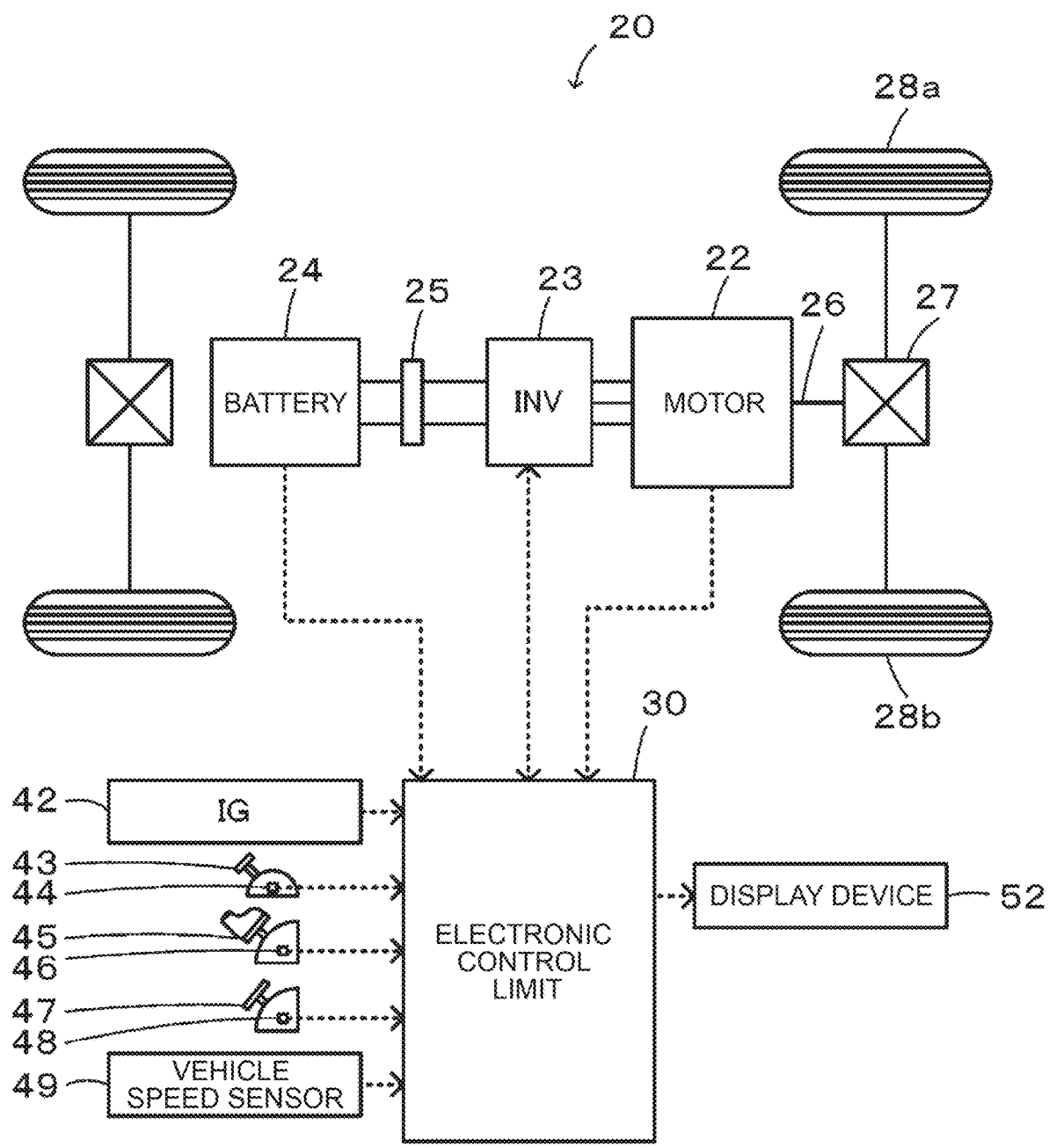
FIG. 1 is a configuration diagram illustrating an outline of a configuration of an electrified vehicle 20 in which an in-vehicle control device according to an embodiment of the present disclosure is mounted.

Next, an embodiment of the present disclosure will be described. FIG. 1 is a configuration diagram illustrating an outline of a configuration of an electrified vehicle 20 in which an in-vehicle control device according to an embodiment of the present disclosure is mounted. Electrified vehicle 20 comprises a motor 22, an inverter 23, a battery 24 and an electronic control unit 30.

The motor 22 is configured as, for example, a synchronous generator motor. The rotor of the motor 22 is connected to a drive shaft 26 connected to the drive wheel 28a, 28b via a differential gear 27. The motor 22 is driven by direct current power from the battery 24 being converted into three-phase alternating current power by the inverter 23 and the three-phase alternating current power being applied by the inverter 23. The motor 22 also functions as a generator by performing regenerative control, generates electric power using the rotational power of the drive shaft 26, and charges the battery 24 via the inverter 23. The battery 24 is configured as a well-known lithium-ion secondary battery or a nickel-hydrogen secondary battery.

The electronic control unit 30 is configured as a microcomputer that is not shown but is configured with a CPU as a center. The electronic control unit 30 receives signals from various sensors via input ports. For example, the electronic control unit 30 receives an ignition signal from the ignition switch 42, a shift position SP from the shift position sensor 44 that detects the position of the shift lever 43, an accelerator operation amount Acc from the accelerator pedal position sensor 46 that detects the depression amount of the accelerator pedal 45, a brake position BP from the brake pedal position sensor 48 that detects the depression amount of the brake pedal 47, a vehicle speed V from the vehicle speed sensor 49, and the like. Further, the electronic control unit 30 receives a rotational position θ from a rotational position sensor (not shown) that detects a rotational position of the motor 22, a battery voltage Vb from a voltage sensor (not shown) attached to an output terminal of the battery 24, a battery current Ib from a current sensor (not shown) attached to an output terminal of the battery 24, and the like. Further, the electronic control unit 30 also receives a switch SW from the changeover switch 50 for switching between various displays of the display device 52. The shift position includes a parking position (P position), a neutral position (N position), a forward drive position (D position), a reverse drive position (R position), a brake position (B position), and the like. The brake position (B position) is a position in which the braking torque applied to the vehicle at the time of the accelerator-off is smaller (larger as an absolute value) than the forward drive position (D position). In the embodiment, the torque when the driving torque is output from the motor 22 is set to a positive value, and the torque when the regenerative torque is output from the motor 22 is set to a negative value. Further, the current and the electric power at the time of discharging from the battery 24 are set to positive values, and the current and the electric power at the time of charging the battery 24 are set to negative values.

The electronic control unit 30 outputs various control signals via an output port. For example, the electronic control unit 30 outputs a display control signal or the like to the display device 52. Further, the electronic control unit 30 outputs a switching control signal for switching a switching element (not shown) to the inverter 23 for driving the motor 22, a drive control signal to the system main relay 25 mounted in the vicinity of the battery 24, and the like.

The electronic control unit 30 calculates the rotational speed Nm of the motor 22 based on the rotational position θ from a rotational position sensor (not shown) that detects the rotational position of the motor 22, and calculates the power storage ratio SOC of the battery 24 based on the battery voltage Vb and the battery current Ib. The power storage ratio SOC is a ratio of the remaining capacity to the total capacity of the battery 24. The electronic control unit 30 also calculates an output limit Wout as the maximum allowable power that can be output from the battery 24 and an input limit Win as the maximum allowable power that can be input (chargeable) to the battery 24 based on the power storage ratio SOC of the battery 24, the thermal Tb of the battery 24, and the like.

Figure 2:
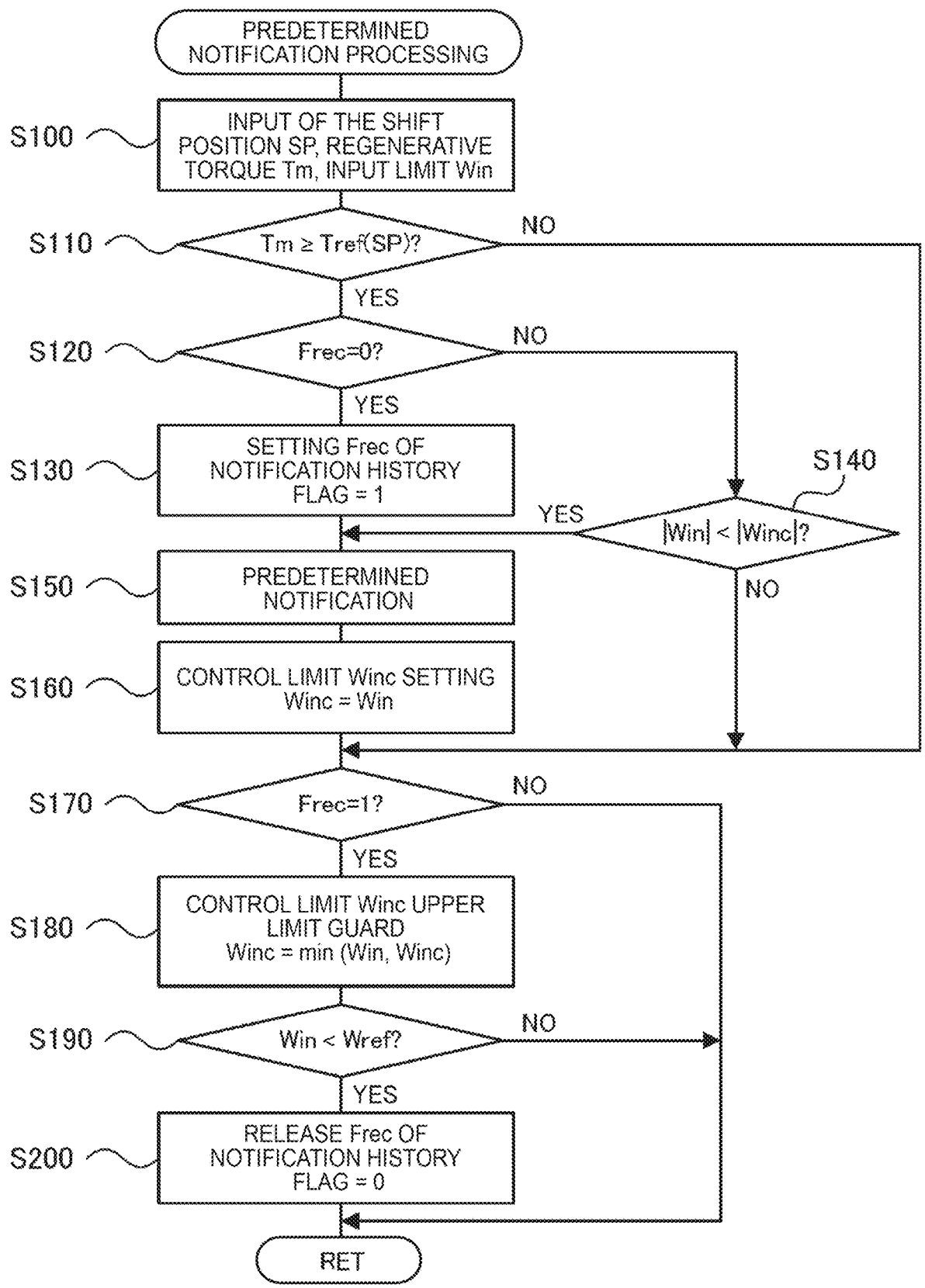
FIG. 2 is a flow chart illustrating an exemplary predetermined notification process executed by the electronic control unit 30.

Next, an operation of electrified vehicle 20 of the embodiment, in particular, an operation when performing a predetermined notification for notifying the driver that the depression of the brake pedal 47 is urged due to an increase in the power storage ratio SOC of the battery 24 and an increase in the input limit Win (which is small as an absolute value) will be described. FIG. 2 is a flowchart illustrating an example of a predetermined notification process executed by the electronic control unit 30. This predetermined notification process is repeatedly executed at predetermined time intervals.

When the predetermined notification process is executed, the electronic control unit 30 first inputs the shift position SP, the regenerative torque Tm by the motor 22, and the input limit Win of the battery 24 (S100). The shift position SP is inputted by the shift position sensor 44. The regenerative torque Tm obtained by the vehicle speed V and the input limit Win of the battery 24 (Tm=k·Win/V) is input. Note that k is a conversion coefficient. The input limit Win of the battery 24 is calculated based on the power storage ratio SOC of the battery 24, the thermal Tb of the battery 24, and the like.

Next, it is determined whether or not the regenerative torque Tm is equal to or greater than the threshold Tref(SP) based on the shift position SP (S110). Threshold Tref(SP) is the braking torque (negative torque) to be applied to the vehicle when the accelerator is turned off. In addition, when the shift position SP is the B position, a value smaller (larger as the absolute value) than when the shift position SP is the D position is used. Since the regenerative torque Tm is a negative value and the threshold Tref(SP) is also a negative value, the process of S110 is synonymous with the process of determining whether the absolute value of the regenerative torque Tm is equal to or less than the absolute value of the threshold Tref(SP).

When it is determined in S110 that the regenerative torque Tm is less than the threshold Tref(SP), it is determined whether or not the notification history flag Frec is the value 1 (S170), and when it is determined that the notification history flag Frec is the value 0, this process is ended. The notification history flag Frec is set by the predetermined notification process, and a value of 0 is set as an initial value at the time of system-startup. Now, considering immediately after the start-up, S110 determines that the regenerative torque Tm is less than the threshold Tref (SP), and S170 determines that the notification history flag Frec is 0. Therefore, the predetermined notification processing ends without nothing in particular.

When it is determined that the regenerative torque Tm is equal to or greater than the threshold Tref(SP) in S110 (the absolute value of the regenerative torque Tm is equal to or less than the absolute value of the threshold Tref (SP)), it is determined whether or not the notification history flag Frec is a value 0 (S120). When it is determined that the regenerative torque Tm is equal to or larger than the threshold Tref (SP) for the first time after the system is started, since the notification history flag Frec is the value 0 of the initial value, it is determined that the notification history flag Frec is the value 0 in S120. In this situation, the value-1 is set in the notification history flag Frec to indicate the history of the predetermined notification (S130), and the deceleration is decreasing. Step on the brake pedal. "A predetermined notification such as displaying a message prompting depression of the brake pedal 47 such as a S150 on the display device 52 is performed, and the input limit Win of the battery 24 at that time is set to the control limit Winc (S160).

Subsequently, it is determined whether or not the notification history flag Frec is value-1 (S170). Consider immediately after S130, S150, S160 has been processed. At this time, in S170, it is determined that the notification history flag Frec is 1, and a minimum select process is performed to set the smaller one of the control limit Winc and the input limit Win to the new control limit Winc (S180). Since the control limit Winc and the input limit Win are negative, S180 process is a process of guarding the control limit Winc by the input limit Win.

Then, it is determined whether or not the input limit Win of the battery 24 is less than the predetermined value Wref (S190). The predetermined value Wref may be a value of an input limit Win of the battery 24 that does not need to consider a decrease in deceleration. That is, S190 determines whether or not a state such as the power storage ratio SOC of the battery 24 is in a state in which it is not necessary to consider a decrease in deceleration. When it is determined that the input limit Win of the battery 24 is less than the predetermined value Wref, the notification history flag Frec is reset to the value 0 (S200), and the process ends.

When it is determined in S120 that the notification history flag Frec is the value 1 (there is a notification history), it is determined whether or not the absolute value of the input limit Win of the battery 24 is smaller than the absolute value of the control limit Winc (whether or not the input limit Win is larger than the control limit Winc) (S140). When it is determined that the absolute value of the input limit Win of the battery 24 is smaller than the absolute value of the control limit Winc (the input limit Win is larger than the control limit Winc), a predetermined notification is made (S150). Then, the input limit Win at that time is set to the control limit Winc (S160), the process after S170 is executed, and the process ends.

When it is determined in S140 that the absolute value of the input limit Win of the battery 24 is equal to or greater than the absolute value of the control limit Winc (the input limit Win is equal to or less than the control limit Winc), the process after S170 is executed without performing the predetermined notification, and the process ends.

Figure 3:
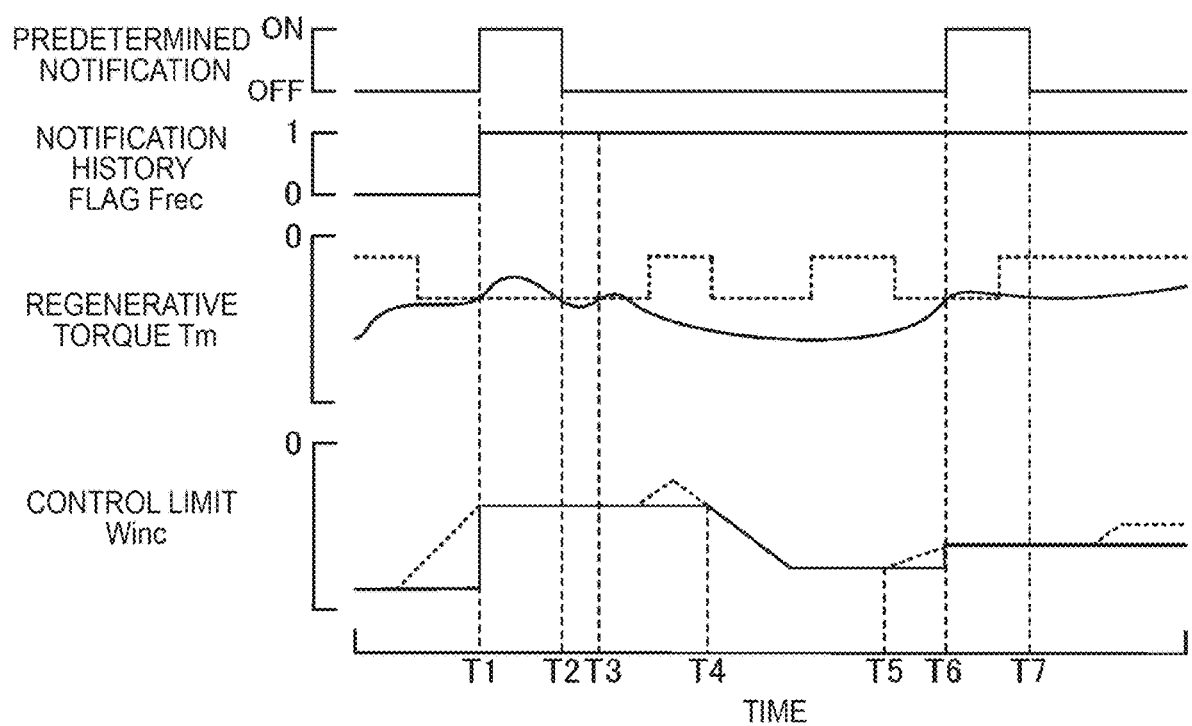
FIG. 3 is an explanatory diagram illustrating an exemplary temporal change of a predetermined notification, a notification history flag Frec, a regenerative torque Tm, and a control limit Winc when the predetermined notification process according to the embodiment is executed.

FIG. 3 is an explanatory diagram illustrating an exemplary temporal change of a predetermined notification, a notification history flag Frec, a regenerative torque Tm, and a control limit Winc when the predetermined notification process according to the embodiment is executed. A broken line in the column of the regenerative torque Tm indicates a threshold Tref (SP), and a broken line in the column of the control limit Winc indicates an input limit Win of the battery 24. When the regenerative torque Tm becomes equal to or larger than the threshold Tref (SP) in the time T1, a predetermined notification is made for a predetermined time until the time T2, a value 1 is set in the notification history flag Frec, and an input limit Win is set in the control limit Winc. When the regenerative torque Tm becomes equal to or larger than the threshold Tref (SP) in the time T3, the notification history flag Frec is 1. Therefore, it is determined whether or not the absolute value of the input limit Win of the battery 24 is smaller than the absolute value of the control limiting Winc. On the other hand, since the input limit Win and the control limit Winc are the same, a negative determination is made, and the predetermined notification is not performed again. From the time T4 to the time T5, the upper limit is guarded by the input limit Win of the control limit Winc. When the regenerative torque Tm becomes equal to or larger than the threshold Tref (SP) in the time T6, the notification history flag Frec is 1. Therefore, it is determined whether or not the absolute value of the input limit Win of the battery 24 is smaller than the absolute value of the control limiting Winc. On the other hand, the absolute value of the input limit Win is smaller than the absolute value of the control limit Winc. From this, an affirmative determination is made, and a predetermined notification is made again up to T7 of times, a value of 1 is set in the notification history flag Frec, and an input limit Win is set in the control limit Winc.

In the electronic control unit 30 (in-vehicle control device) mounted in electrified vehicle 20 of the embodiment described above, when the regenerative torque Tm becomes equal to or higher than the threshold Tref (SP), a predetermined notification is made to urge the brake pedal 47 to depress for a predetermined period of time. Along with the predetermined notification, a value 1 is set in the notification history flag Frec, and an input limit Win is set in the control limit Winc. Thereafter, when the regenerative torque Tm becomes equal to or larger than the threshold Tref (SP) while the notification history flag Frec is at the value 1, if the absolute value of the input limit Win of the battery 24 is smaller than the absolute value of the control limit Winc, a predetermined notification is made to prompt the brake pedal 47 to depress for a predetermined period of time. On the other hand, when the absolute value of the input limit Win of the battery 24 is equal to or greater than the absolute value of the control limit Winc, the predetermined notification is not performed. As a result, it is possible to suppress a notification (predetermined notification) prompting the brake pedal 47 to be depressed when the regenerative braking force decreases based on the state of the battery 24 from being frequently performed.

In electrified vehicle 20 of the embodiment, the motor 22, the inverter 23, and the battery 24 are provided. However, any type of electrified vehicle, such as a fuel cell electric vehicle or a hybrid electric vehicle, may be used as long as the battery is charged with electric power obtained by regeneratively driving the motor.

The correspondence between the main elements of the embodiments and the main elements of the disclosure described in the column of the means for solving the problem will be described. In the embodiment, the motor 22 corresponds to the "electric motor", the battery 24 corresponds to the "electric storage device", and the electronic control unit 30 corresponds to the "in-vehicle control device".

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the present disclosure has been described above using the embodiment, the present disclosure is not limited to the embodiment in any way, and may be implemented in various modes without departing from the scope of the present disclosure.

The present disclosure can be used in the manufacturing industry of in-vehicle control devices and the like.

What is claimed is:

1. An in-vehicle control device to be mounted on an electrified vehicle including an electric motor for traveling and a power storage device configured to exchange electric power with the electric motor, wherein the in-vehicle control device is configured to when regenerative torque obtained by regenerative driving of the electric motor reaches a predetermined threshold or more, perform a predetermined notification and store a record of the predetermined notification, and store, as control input power, maximum permissible input power that is inputtable to the power storage device when the predetermined notification is performed, and in a case where the record of the predetermined notification is present, perform the predetermined notification again when the regenerative torque is the predetermined threshold or more and an absolute value of the maximum permissible input power is less than an absolute value of the control input power.

2. The in-vehicle control device according to claim 1, wherein an upper limit of the control input power is guarded by the maximum permissible input power.

3. The in-vehicle control device according to claim 1, wherein the predetermined threshold is set based on a shift position.

4. The in-vehicle control device according to claim 1, wherein the predetermined notification is a notification that prompts a driver to perform a brake operation.

* * * * *